(12) United States Patent
    Cournoyer (10) Patent No.: US 12,148,901 B2
(45) Date of Patent: Nov. 19, 2024

(54) SYSTEMS AND METHODS FOR DISASSEMBLING A BATTERY MODULE

(71) Applicant: Rivian IP Holdings, LLC, Plymouth, MI (US)

(72) Inventor: Travis Cournoyer, Redondo Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 368 days.

(21) Appl. No.: 17/464,429

(22) Filed: Sep. 1, 2021

(65) Prior Publication Data

US 2023/0060659 A1     Mar. 2, 2023

(51) Int. Cl.
    *H01M 10/54*      (2006.01)
    *H01M 10/02*      (2006.01)

(52) U.S. Cl.
    CPC .......... *H01M 10/54* (2013.01); *H01M 10/02* (2013.01); *H01M 2220/20* (2013.01)

(58) Field of Classification Search
    CPC .. H01M 10/54; H01M 10/02; H01M 2220/20; B32B 43/006
    See application file for complete search history.

(56) References Cited

U.S. PATENT DOCUMENTS

| 2012/0308873 | A1* | 12/2012 | Sekino ............... H01M 50/227 |
| | | | 429/156 |
| 2019/0198952 | A1* | 6/2019 | Choi ..................... H01M 50/20 |
| 2022/0029217 | A1* | 1/2022 | Young .............. H01M 10/0525 |

FOREIGN PATENT DOCUMENTS

| CN | 113322380 B | * | 11/2021 | |
| KR | 20200043844 A | * | 4/2020 | .......... B25J 11/0055 |
| WO | WO-2016121279 A1 | * | 8/2016 | ............ H01M 10/54 |

\* cited by examiner

*Primary Examiner* — George R Koch
(74) *Attorney, Agent, or Firm* — Haley Guiliano LLP (57) ABSTRACT

Systems and methods are provided herein for disassembling a battery system. Further, systems and methods are provided herein for a battery apparatus configured for disassembly of a battery system. In addition, systems and methods are provided herein for preparing a battery system including a first plurality of members bonded with a first adhesive and a second plurality of members bonded with a second adhesive for disassembly of the battery system.

20 Claims, 6 Drawing Sheets

SYSTEMS AND METHODS FOR DISASSEMBLING A BATTERY MODULE

INTRODUCTION

An electric vehicle uses a large number of battery cells and battery cells have a limited lifetime. Battery cell degradation mechanisms can be determined as a function of age at temperature, depth of discharge, number of cycles, current rating, and time spent at high or low state of charge. Accordingly, at some point, battery cell arrays built into large format energy storage devices may reach end of their useful life and require disposal or recycling. However, disposing of or recycling the battery cell arrays may be costly. A battery module may include battery cells, plastics, electronic control units (ECUs), cooling tubes and plates, adhesives, metal busbars, or other materials. During the battery module breakdown, most materials in the battery module end up being discarded, which leads to increasing volumes of residual sludge waste generated throughout large-format lithium-ion battery storage recycling.

Alternatively, when servicing a battery module, to make repairs or investigate failures of units in the field, a need exists for availability to take apart the battery module in an efficient manner. For example, a need exists to have root cause analysis to develop these large-format lithium-ion battery storage devices to improve the design or address warranty-related issues. This is different, however, from end-of-life recycling because the integrity of each part needs to be maintained within the battery module to retain any information that could be useful for the root cause activity. For this reason, teardowns of battery modules are a long and arduous process. When coupled with the battery module's electronic nature and the sensitivity to thermal runaway for the battery cells, such a teardown of the battery module is expensive, dangerous, and timely.

These problems are exacerbated when the use of fasteners is replaced with adhesives in battery designs. Once an adhesive sets between two members, it is difficult for the two members to separate. Further, in some circumstances, a number of different adhesives may be used during the formation of the battery module for various functions, for example, to combine structural support, electrical isolation, thermal management, or even flame retardance into the adhesives by infusing them with additives like alumina, aluminum trihydrate (ATH), boron nitride, magnesium dihydrate (MDH), or even diamond. Accordingly, using various adhesives, the battery module disassembly process is more energy-intensive and requires physical labor. Consequently, what is needed is an improved way to maintain and disassemble battery modules connected via adhesives.

SUMMARY

In some embodiments, the present disclosure is directed to a method for disassembling a battery system. In some embodiments, the present disclosure is directed to a method for disassembling a battery system without fasteners. The method includes preparing a battery system including a plurality of members of the battery for treatment with a mixture. The method further includes treating the battery system with a dielectric mixture to remove or break the bonded joints or adhesive joints between the plurality of members and disassembling the plurality of members. The members of the battery system are bonded together with the use of adhesives. In some embodiments, the battery system includes two or more adhesives bonding together members of the battery system. The dielectric mixture employed to remove or break the bonded joints between the plurality of members is selected from one of polyalphaolefins, fluorinated fluids and synthetic esters and natural esters. In some embodiments, the dielectric mixture is non-aqueous and includes esters for the removal or breakdown of the adhesives. The esters may be a fatty acid ester solvent, preferably a fatty acid methyl ester mixture combined with an alkylamine compound that acts as an adjuvant.

In some embodiments, the battery system includes a first type of adhesive that bonds a first plurality of members of the battery system and a second type of adhesive that bonds a second plurality of members of the battery system. In some embodiments, the first adhesive may be applied to at least one of a carrier and a plurality of battery cells, and positions the plurality of battery cells in respective recesses of the carrier. The first adhesive bonds the plurality of battery cells to the carrier. In some embodiments, a second adhesive applied to at least one of a lateral surface of a sidewall and a side of the plurality of battery cells, and positions the lateral surface of the sidewall against the plurality of battery cells. The second adhesive bonds the sidewall to the side of the plurality of battery cells. In some embodiments, the first adhesive and the second adhesive are a different types of adhesives. In some embodiments, the second adhesive includes a fast-cure adhesive and a slow-cure adhesive, and the first adhesive includes a slow-cure adhesive.

In some embodiments, the method includes preparing a battery system including a first plurality of members that bond with a first adhesive and a second plurality of members that bond with a second adhesive for the treatment of the respective members of the battery system. For example, by separating the battery module out of vehicle storage compartments and removing any members that are connected via fasteners. In some embodiments, the battery module may or may not be disassembled completely, but only a particular section of the battery system may need to be treated to break the adhesive joint holding the section. The method further includes treating the battery system with a dielectric mixture to break the bonded joints between the first plurality of members and the second plurality of members and disassembling the battery system, and potentially modules and/or sections of the modules. The treatment may be performed by spraying, submersion, or a combination of the two. In some embodiments, the battery system's adhesive bonds are sprayed with the dielectric mixture as part of the treatment to break the bonds. As a result of the breakdown of the adhesive between modules of the battery system and after disassembly of the module from the battery system, the battery apparatus may be reassembled into the battery system with one or more adhesives.

In some embodiments, the method further includes treating a battery system including a third adhesive. In some embodiments, the third adhesive bonds at least one of a current collector assembly and the carrier, and positions the current collector assembly against a second side of the carrier. The third adhesive may bond the current collector assembly to the carrier. In some embodiments, the method further includes treating a battery system including a fourth adhesive. The fourth adhesive may bond to at least one of the plurality of battery modules and a cooling plate, and positions the plurality of battery modules against the cooling plate. The fourth adhesive bonds the plurality of battery modules to the cooling plate. In some embodiments, the first adhesive, the second adhesive, the third adhesive, and the fourth adhesive are a different types of adhesives. In some embodiments, each of the first adhesive, the second adhesive, the third adhesive and the fourth adhesive is an acrylic adhesive. In some embodiments, each of the first adhesive, the second adhesive, the third adhesive, and the fourth adhesive is selected from one of a thermal adhesive, a high strength adhesive, or a UV adhesive or a combination of thereof.

In some embodiments, as part of the treatment of the battery system, the method includes submerging the battery system in a bath of a dielectric mixture for a predetermined period. Upon the battery system exceeding the predetermined period, removing the battery system from the bath of the dielectric mixture. In some embodiments, while the battery system is submerged, the method includes agitation of the dielectric mixture. For example, as the battery system is submerged in the dielectric mixture, sonication is applied to the mixture. Although sonication is provided as an example, it is not limiting, and any form of agitation of the mixture may be used, mixer, circulation pump, etc. In some embodiments, the method includes allowing the dielectric mixture to penetrate the first type of adhesive and the second type of adhesive up to a predetermined threshold. The method further includes removing the battery system from the bath of the dielectric mixture when the dielectric mixture penetrates the first type of adhesive and the second type of adhesive past the predetermined threshold.

In some embodiments, as part of the treatment of the battery system, the method includes submerging the battery system in a bath of a dielectric mixture for a predetermined period. For example, the predetermined period may be a range based on the location of the adhesive in the battery and the thickness of the adhesive. In some aspects, the predetermined period may be a 5, 15, 30 minutes period. In another aspect the predetermined period may be upto 8 hours. Upon the battery system exceeding the predetermined period removing the battery system from the bath. The method may further monitor the hardness of the first type of adhesive and the second type of adhesive. For example, the method may monitor for a decrease in hardness of more that 25%, 30%, 35%, 40%, 45%, 50% or higher based on the location of the adhesive on the battery and the thickness of the adhesive as compared to pretreated hardness, upon the hardness falling below a hardness threshold, removing the battery system.

In some embodiments, the present disclosure is directed to a battery apparatus configured for disassembling. The battery apparatus includes a plurality of battery modules, a carrier, a current collector, a sidewall, and a cooling plate, assembled using two or more adhesives. The plurality of battery modules is configured to provide electrical energy. The carrier is configured to maintain the alignment of the plurality of battery modules. In some embodiments, the carrier includes a plurality of recesses configured to receive the plurality of battery modules on a first side of the carrier. The current collector is configured to be electrically coupled to the plurality of battery modules to form one or more buses. The sidewall is configured to provide structural support to the apparatus. The cooling plate is configured to transfer or extract heat from the plurality of battery cells. A first adhesive bonds a first side of the carrier to the plurality of battery cells, a second adhesive bonds the sidewall to the plurality of battery cells. The first adhesive and the second adhesive are selected such that when treated by a single dielectric mixture, bonded joints of the first type of adhesive and bonded joints of the second adhesive are at least partially broken. In some embodiments, a third adhesive bonds the current collector to a second side of the carrier, and a fourth adhesive bonds the plurality of battery cells to the cooling plate. In such an embodiment, the first adhesive, the second adhesive, the third adhesive, and the fourth adhesive are selected such that when treated by a single dielectric mixture, bonded joints of the respective adhesives are at least partially broken.

In some embodiments, the sidewall includes at least one short side bonded to the plurality of battery modules using the second adhesive and at least one long side bonded to the plurality of battery modules using the second adhesive and the third adhesive. For example, in some embodiments, the sidewall includes one or more sections to provide support, isolation, or both to the battery cells.

In some embodiments, each of the first adhesive and the second type of adhesive is a different adhesive. In some embodiments, the second adhesive includes a fast-cure adhesive and a slow-cure adhesive, and the first adhesive is a slow-cure adhesive.

In some embodiments, the present disclosure is directed to an apparatus for disassembling a battery module. The apparatus includes a conveyor, a container system, and a disassembly conveyer. The conveyor is configured to transport the battery modules to the container system. The container system includes a container, a sonifier, and a heater. The container is configured to hold a bath of the dielectric mixture. The sonifier is configured to agitate the dielectric mixture when the battery module is submerged. The heater is configured to heat the dielectric mixture to a predetermined temperature. The disassembly conveyor is configured to receive the treated battery module for disassembly of the battery module. In some embodiments, the apparatus operates in a batch operation, where the battery modules remain submerged in a bath of the dielectric mixture for an extended period of time. In some embodiments, that apparatus operates in a continuous operation, where the battery module is submerged in a bath of the dielectric mixture and moved within the container system.

Accordingly, the apparatus for disassembling, or method for disassembling as described herein, permit for a battery system with limited or no fasteners while allowing for an efficient and cost-effective breakdown of the battery system. This further permits a higher quantity of materials to be recycled as the battery system is broken down.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Battery electric vehicles (BEVs) that are propelled by an electric drivetrain may have long charge times on the order of tens of minutes, and BEV manufacturers generally desire to increase the energy density of the BEV battery packs. Higher energy density battery packs may have a higher capacity-weight ratio and thus, achieve a longer vehicle range. BEV battery packs that rely heavily on the use of fasteners take up valuable packaging space that could otherwise be filled with more battery cells. Accordingly, BEV battery packs can employ adhesives to hold together the many battery cells to increase capacity; however, maintenance of such battery packs is cost-prohibitive because of the energy required to disassemble the battery packs at the end of life or in the maintenance of the battery pack. Accordingly, there is a need for serviceable battery packs that may be disassembled without extensive and laborious effort.

As referred to herein, the terms "solvent" or "mixture" may be used interchangeably and refer to a solvent capable of dissolving or swelling an adhesive in an amount of 5 wt. % or more even at a low temperature of 60° C. or less.

In some embodiments, the present disclosure is directed to a battery module designed to be disassembled after treatment with a solvent or a mixture. In some embodiments, the terms "solvent" and "mixture" as used herein refer to dielectric solvents and mixtures. In some embodiments, the battery systems may rely substantially on adhesives, and such adhesives may be designed to be incompatible with a dielectric mixture to support the end of life disposal. For example, battery systems are selected so that the adhesives employed in the structural, load-bearing joints may be incompatible with the dielectric mixture. In contrast, the plurality of members of the battery system are compatible with the dielectric mixture. In some embodiments, adhesives may be used for primary structural support, with fasteners included for redundancy. For example, in some embodiments, high voltage busbars of a battery module are compatible with a dielectric mixture which permits the bridging of electrical terminals without exposing the risk of electrical shorting and may include a redundant pushpin rivet nut due to the potential severity of a failure coupled with the potential likelihood of occurrence due to the high temperatures that the busbars can reach under some circumstances.

In some embodiments, the use of adhesive rather than fasteners to join parts allows filling of gaps between parts as well as providing a substrate through which mechanical, thermal, and/or electrical loads can transmit. For example, each adhesive joint within a battery module may serve multiple functions during operation including, for example: (1) transferring quasi-static loads between part A and part B; (2) transferring mechanical shock pulses between part A and part B; (3) transferring thermal energy between part A and part B; and (4) resisting the transfer of electrical energy between part A and part B. For the multifunctional purpose of each adhesive joint, partially breaking the joint becomes very challenging. In some embodiments, the treatment of the battery system either by spraying, submersion, or a combination of the two allows for simple disassembly of the battery module in a controlled, non-toxic, sustainable manner with a dielectric mixture that can be biodegradable at the end of its useful life.

To illustrate, even though some adhesives may be roughly three orders of magnitude (or more) denser than the air that they displace between parts, packaging savings may still outweigh the mass in the overall energy density calculation. This is because, as compared to fasteners, the additional clearances that would be required around bolt heads and threads may be saved for the inclusion of more battery cells.

In an illustrative example, adhesives that meet dielectric criteria along with the bonding criteria in accordance with the present disclosure may be referred to as Structural, Thermal, Electrical Interface Materials (STEIM). For example, typical adhesives may only address only one of these (e.g., adhesives having thermal management exclusively as a function). To illustrate, the distinction between adhesives that are STEIM vs. thermal interface materials (TIM) may be significant because the validation of the functional performance of adhesives fulfilling structural, electrical, and thermal requirements can drastically impact the plan by which their performance in the design must be validated (e.g., the testing environment). In some embodiments, the adhesives selected for use in the battery system are acrylic adhesives that are incompatible with the dielectric mixture for disassembling the joints.

In some embodiments, the present disclosure is directed to an apparatus for disassembling a battery module that includes a set of adhesives including a thermal adhesive used for structural bonding of battery modules to a cooling plate incompatible with a dielectric mixture. For example, the thermal adhesive may exhibit a thermal conductivity range of 1 to 1.1 W/mK. In a further example, the thermal conductivity may be limited to about 1.1 W/mK or below to prevent a thermal filler loading that is too high, thus making the adhesive too brittle to reliably absorb shock and vibration loads during operation without cracking. In a further example, the lap shear strength of a thermal adhesive configured to bond nickel-plated steel may be about 14 MPa at the beginning of operation life and the adhesive may be configured to absorb less than 2% by weight water during a 2-hour long boiling water soak. In a further example, the glass transition temperature of a thermal adhesive may be selected to exceed the highest operational temperature of the battery cells by at least 30° C. to reduce fatigue from cycling through the glass transition temperature during operation.

Suitable verification of a set of adhesives may help ensure failures during operation are unlikely. For example, by specifying multiple requirements for each adhesive joint, the design verification plan (DVP) for each adhesive used in the design may be relatively more complex than has been seen before in the adhesives industry. Traditionally, the adhesives are selected for a single purpose (e.g., structural support or thermal interface management), but when these requirements are coupled with, for example, dielectric requirements, the validation matrix may triple (at least) for each adhesive. For example, illustrative characteristics to consider in a test matrix may include (1) bulk adhesive properties, (2) adhesive joint properties, and (3) degradation modes during operation.

Bulk adhesives properties are typically available for review for many off-the-shelf adhesives (e.g., and generally are relatively easy to determine). Material characteristics may include those related to mechanical strength during operation (e.g., lap shear, tensile strength, t-peel strength, modulus) and in simulation (e.g., Poisson ratio, loss modulus), dielectric strength (e.g., in terms of voltage, volume, and surface resistance), thermal performance (specific heat capacity, thermal conductivity), or a combination thereof. In accordance with the present disclosure, the set of bulk characteristics may be determined at all temperatures within the operational temperature range of the battery pack. For example, the characteristics may be determined either directly or indirectly (e.g., determining a sufficient number of data points to generate a performance curve as a function of temperature). To illustrate, tests may need to be performed inside a thermal chamber at temperatures ranging from as low as −40° C. to as high as 55° C.

If the validation scheme is partitioned into the relevant requirements for all of the individual joints of a battery module, the test matrix may become more complex. For example, a single adhesive may be used for a plurality of joints and may be bonded directly to a plurality of different materials such as, for example, polycarbonate, epoxy powder-coated aluminum, stainless steel, nickel-plated steel, nylon, aluminum, any other suitable material used in a battery module, or any combination thereof. During developmental testing, the strength of adhesive bonding to each of these substrates may be determined. For example, because shear strength may be the primary characteristic of adhesives, joints may be designed for loading in shear and the strength to these substrates should be measured with lap shear tests on suitable material testing equipment. In a further example, in the case that joints are expected to be loaded mostly in T-peel (e.g., a linear tensile loading at the end of a joint), a suitable T-peel test may be performed instead. In another example, the compatibility with a dielectric mixture may be evaluated by measuring the mass of sample adhesives and the hardness of each sample. In some circumstances, the bulk adhesive strength may exceed the bonding strength to a particular surface. Accordingly, process parameters may be identified to increase the strength of adhesion to the surface (e.g., before final part tools are generated).

Regarding degradation factors, the effect of loss of functional performance at each joint may be monitored by measuring, for example: (1) moisture absorption from humidity; (2) moisture absorption from ionized particulates (cell venting); (3) moisture absorption from incidental exposure to coolant (e.g., 50:50 water:ethylene glycol); (4) cycling through glass transition temperature (Tg); (5) mechanical fatigue from cycling; (6) stress crack propagation from thermal cycling; (7) creep at high temperature; any other suitable parameter or phenomenon; or any combination thereof. In some circumstances, degradation tests are performed before destructive mechanical tests such as lap shear. However, because of the electrical and thermal functions that these adhesives also may fulfill, degradation factors may be applied to test coupons that are subsequently run to re-validate electrical and thermal characteristics as well. Accordingly, degradation factors may be considered in totality with electrical and thermal operating conditions.

In some embodiments, the present disclosure is directed to an apparatus that disassembles a battery module via a dielectric mixture. The battery module includes adhesives directed at structural support, thermal management, and dielectric protection. Some benefits of using dielectric mixtures to disassemble the adhesives employed in battery modules include improvements to support of end of life disposal, to allow for part-by-part recycling after being glued together for long periods, and for quick, simple, safe, low-energy teardown analyses to take place on adhesively structured battery modules.

Figure 1:
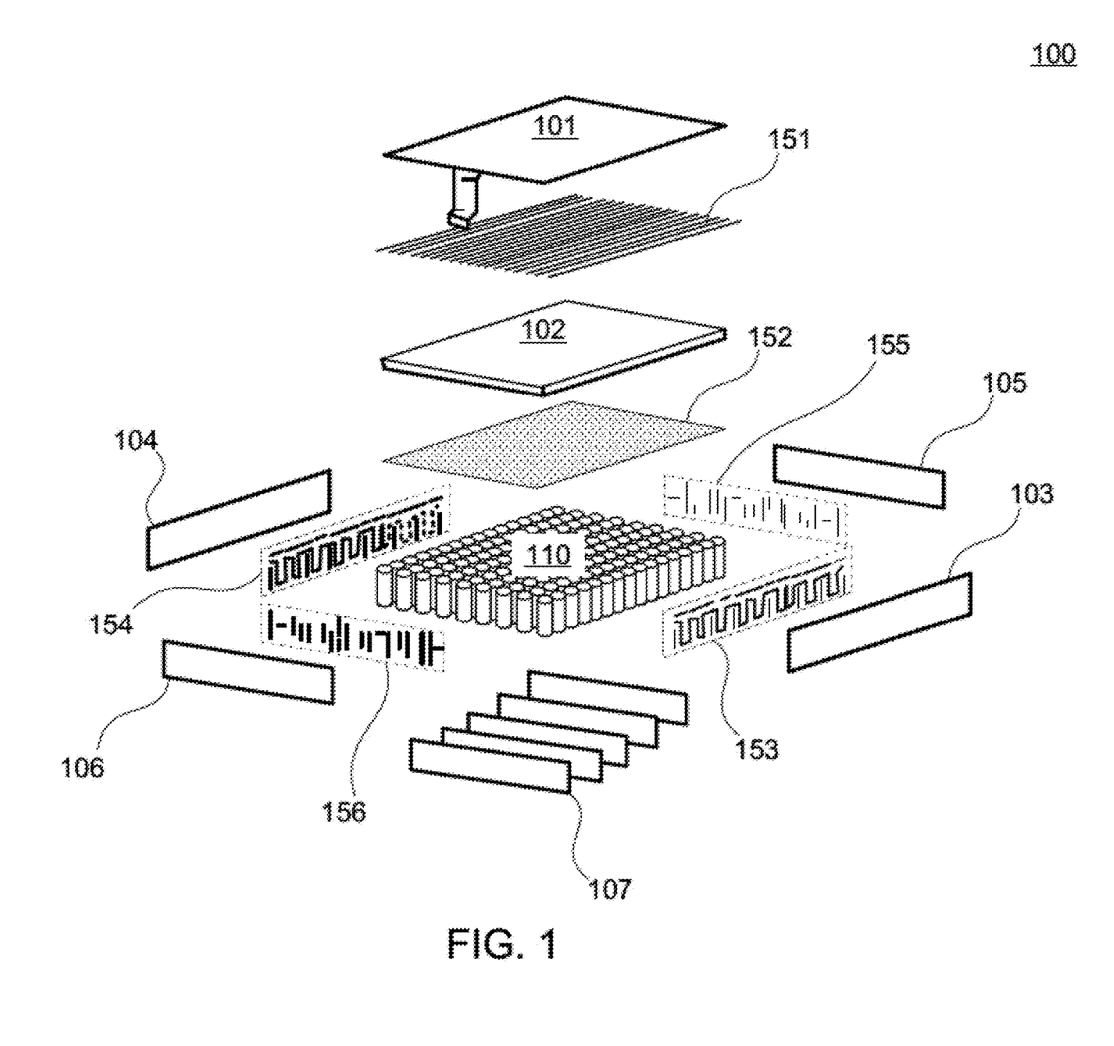
FIG. 1 shows an exploded view of an illustrative battery module, including adhesive joints, in accordance with some embodiments of the present disclosure.

FIG. 1 shows an exploded view of illustrative battery module 100, including adhesive joints, in accordance with some embodiments of the present disclosure. The battery module 100 includes a plurality of battery cells 110, carrier 102, layer 101, dividers 107, and sidewall sections 103-106, affixed together using adhesives 151-156. As used herein, the term "sidewall" refers to the collection of lateral surfaces arranged around a plurality of battery cells, and may include a single section or more than one section (e.g., a plurality of sections such as four sections, as illustrated), arranged adjacent to each other or with gaps in between one or more neighboring sections. To illustrate, sidewall sections 103-106 may be joined as, or otherwise parts of, a single component (e.g., bent sheet metal), optionally with an open seam to allow ease of installation. As illustrated, adhesive 152 bonds plurality of battery cells 110 to carrier 102; adhesive 151 bonds carrier 102 to layer 101; adhesive 153 bonds side wall section 103 to a first side of plurality of battery cells 110; adhesive 154 bonds side wall section 104 to a second side of plurality of battery cells 110; adhesive 155 bonds side wall section 105 to a third side of plurality of battery cells 110; adhesive 156 bonds side wall section 106 to a fourth side of plurality of battery cells 110; and dividers 107 are arranged among plurality of battery cells 110 (e.g., between adjacent groups of battery cells that are electrically connected in series) and bonded to carrier 102 by adhesive 152. The sides of plurality of battery cells 110 include a collection of cylindrical interfaces to which sidewall sections 103-106 may be bonded. For example, each of sidewall sections 103-106 may contact only a portion of battery cells arranged on the respective side (e.g., an outermost portion). In a further example, sidewall sections 103-106 may be flat, curved, segmented, compound-shaped, scalloped (e.g., to accommodate and more fully follow the curved battery cells), have any other suitable profile or shape, or any combination thereof.

In some embodiments, carrier 102 includes a plurality of recesses. For example, carrier 102 may include an array of holes configured to accommodate respective battery cells of plurality of battery cells 110. To illustrate, each battery cell of plurality of battery cells 110 may be positioned in a respective recess of carrier 102, which arranges plurality of battery cells 110 laterally. The arrangement may include a close packing (e.g., hexagonal close packing having any suitable spacing), an array (e.g., a rectangular array), or any other suitable arrangement. In some embodiments, each battery cell of plurality of battery cells 110 may be pressed axially such that ends of the plurality of battery cells distal to carrier 102 substantially lie in a plane parallel to carrier 102 (e.g., thus laterally and axially aligned). Accordingly, adhesive 152 may be a continuous layer, a layer having holes or openings, an arrangement of suitable drops or dollops that correspond with the arrangement of plurality of battery cells 110, a path that extends to interface with each battery cell of plurality of battery cells 110 (e.g., in a serpentine path), any other suitable application type, or any combination thereof.

Layer 101 may include one or more current collectors configured to be electrically coupled to plurality of battery cells 110, or a subset thereof. For example, layer 101 may include a current collector assembly including a plurality of current collectors (e.g., which may include comb-like structures that spread over the battery cells in the plane of layer 101). Each current collector may be coupled to a subset of plurality of battery cells 110 to form electrical buses. The electrical coupling may be achieved by bonding, welding (e.g., ultrasonic welding, laser welding), pressing or spring force, or a combination thereof. To illustrate, carrier 102 may be dielectric or otherwise non-conducting electronically, thus providing insulation between layer 101 and plurality of battery cells 110. Accordingly, a plurality of leads may be affixed to the current collector(s) and plurality of battery cells 110 to create electrically conductive paths among plurality of battery cells 110. The current collectors may electrically couple subsets of battery cells in parallel, with the subsets being electrically coupled in series.

In some embodiments, adhesives 152, 155, and 156 include the same type of adhesive. In some embodiments, adhesives 153 and 154 each include the same one or more adhesives. For example, adhesive 153 and adhesive 154 may each include two adhesives to form a pattern (e.g., a fast-cure and a slow-cure adhesive). In some embodiments, adhesive 151 has a relatively high dielectric strength to prevent electrical shorting from plurality of battery cells 110 to layer 101 (e.g., layer 101 may include one or more current collectors and insulators). For example, in some embodiments, adhesive 151 may be the same as at least one component or portion of adhesives 153 and 154.

In some embodiments, battery module 100 corresponds to a battery submodule and two submodules are joined together to form a battery module. For example, an adhesive can be used to bond the bottoms of battery cells 110 to a first side of a cooling plate and a separate battery submodule can be bonded to a second opposite side of the cooling plate. In some embodiments, the adhesive used to bond the battery cells to the cooling plate has a high thermal conductivity to allow heat transfer from the battery cells to the cooling plate. In some embodiments, this adhesive is the same type as one or more of adhesives 151-156.

Figure 2:
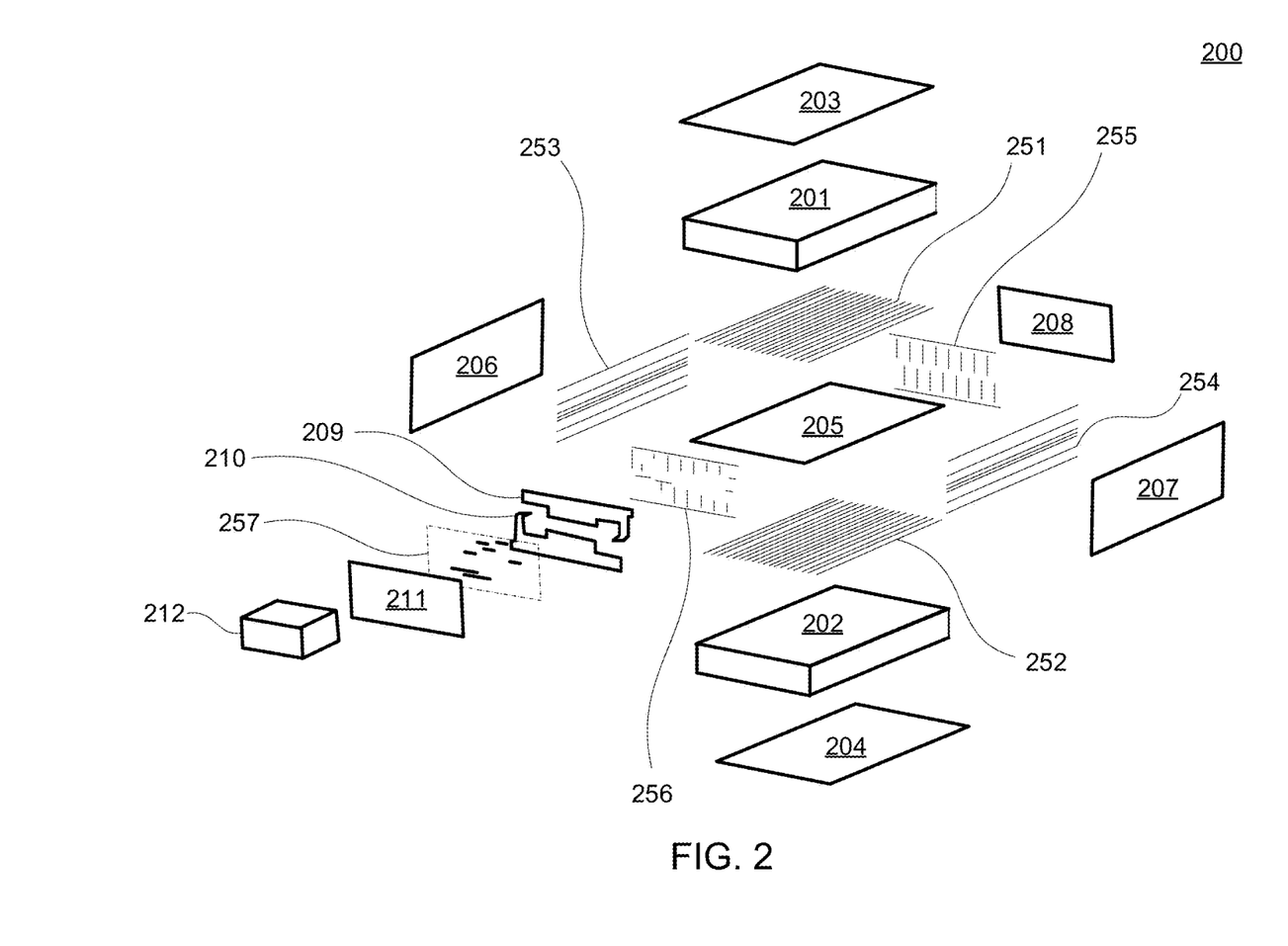
FIG. 2 shows an exploded view of an illustrative battery module, including two battery packs (e.g., submodules) and adhesive joints, in accordance with some embodiments of the present disclosure.

FIG. 2 shows an exploded view of illustrative battery module 200, including two battery submodules and adhesive joints, in accordance with some embodiments of the present disclosure. Each of the battery submodules 201 and 202 may be, but need not be, the same as battery module 100 of FIG. 1. Battery module 200 includes battery submodules 201 and 202, covers 203 and 204, cooling plate 205, shear walls 206 and 207, busbar 208, terminal busbars 209 and 210, isolation bracket 211, and control circuitry 212, affixed together using adhesives 251-257. As illustrated, adhesive 251 bonds battery submodule 201 to cooling plate 205; adhesive 252 bonds battery submodule 202 to cooling plate 205; adhesive 253 bonds shear wall 206 to battery submodules 201 and 202; adhesive 254 bonds shear wall 207 to battery submodules 201 and 202; adhesive 255 bonds busbar 208 to battery submodules 201 and 202; adhesive 256 bonds terminal busbars 209 and 210 to battery submodules 201 and 202, respectively; and adhesive 257 bonds isolation bracket 211 to terminal busbars 209 and 210. In some embodiments, adhesives 253, 254, 255, 256, and 257 are selected based on the function, for example, structural support, thermal management, dielectric protection and exhibit relatively high shear strength.

Figure 3:
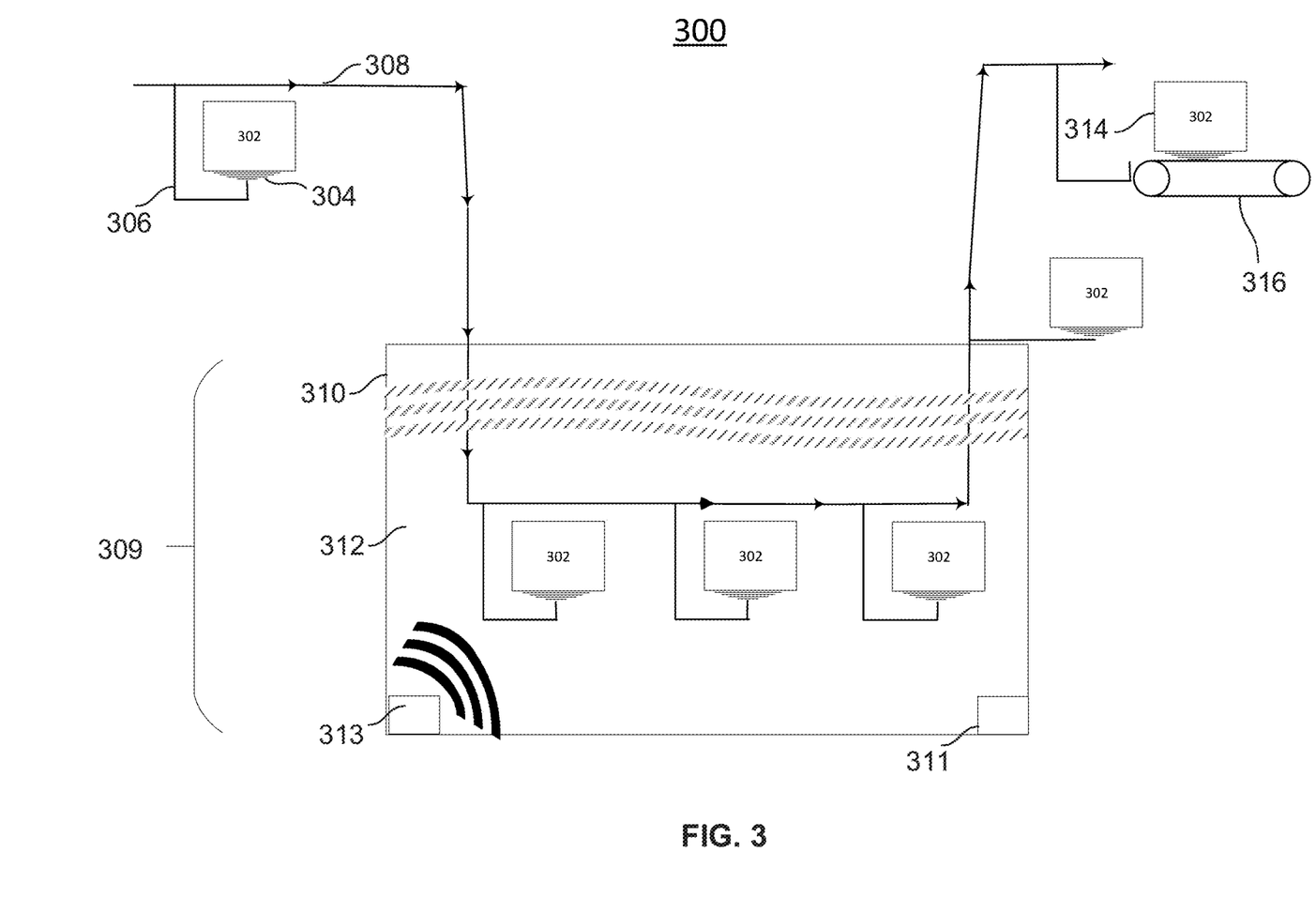
FIG. 3 shows an illustrative view of the apparatus for disassembling the battery modules, in accordance with some embodiments of the present disclosure.

FIG. 3 shows an illustrative view of apparatus 300 for disassembling battery modules, including a plurality of battery cells and adhesive joints, in accordance with some embodiments of the present disclosure. Each of the battery module 302 may be, but need not be, the same as or include battery module 100 of FIG. 1. In some embodiments, battery module 302 may include the same members as battery module 200 of FIG. 2, for example, battery submodules 201 and 202, covers 203 and 204, cooling plate 205, shear walls 206 and 207, busbar 208, terminal busbars 209 and 210, isolation bracket 211, and control circuitry 212, affixed together using adhesives 251-257.

As illustrated in FIG. 3, disassembly apparatus 300 includes a conveyor 308, a container system 309 and a disassembly conveyor 316. The conveyor 308 includes attachments 306 that extend below a battery module 302 and hold the battery module 302 in place as the battery module 302 traverses the disassembly apparatus 300. For example, attachment 306 extends under each battery module 302 so that each of sidewalls 206, 207, 208 and 211 are at least partially exposed and allowed to be treated with the mixture. In some embodiments, after treatment of the battery module 302 with the mixture 312, the side walls 206, 207, 208 and 211 may be removed with minimal external force. In some embodiments, the sidewalls 206, 207, 208 and 211, after treatment with the mixture 312, may fall off the battery module 302 independently. In some embodiments, the disassembly apparatus 300 includes an attachment contacting the battery module by one or two or more sidewalls 206, 207, 208 and 211. For example, covers 203 and 204, after treatment with the mixture 312, may disassemble with minimal to no external force. In yet another embodiment, the battery module is dangling as it travels in the container mixture 312 bath. For example, the conveyor may be contacting any one of the covers 203, 204, or the sidewalls 206, 207, 208 and 211. In yet another embodiment, the battery module is treated while remaining stationary. For example, the battery module 302 or any one of the covers 203, 204, or the sidewalls 206, 207, 208 and 211 of the battery module 302 is sprayed while remaining stationary.

The container system 309 includes a container 310, configured to hold the dielectric mixture 312, a sonifier 313 configured to provide sonication to the mixture, and a heater 311 configured to heat the dielectric mixture. For example, the container 310 may resemble a bath for the battery module 302. The container 310 is configured to holds the dielectric mixture 312, where the battery modules 302 are treated by submerging the battery module 302 in the mixture 312. In some embodiments, the battery modules 302 are treated by being submerged in the container 310, which holds the bath of the dielectric mixture 312. Although in the illustrative FIG. 3, container 310 includes 3 battery modules 302 submerged in the dielectric mixture 312, such an illustrative example is not limiting and any number of battery modules 302 may be submerged. In some embodiments, as a battery module 302 emerges from the dielectric mixture, each of the adhesive joints is significantly weakened. For example, the adhesive joints are broken or partially broken so that the battery members may be disassembled. In some embodiments, the battery modules 302 may undergo further treatment as certain members of the battery module are removed. For example, covers 203, 204, or sidewalls 206, 207, 208 and 211 of the battery module 302 may be removed after initial treatment with the mixture and further treatment may be performed on the remaining battery module. Further treatment of the remaining battery module may be performed by spraying, submersion, or a combination of the two with the dielectric mixture 312. In some embodiments, the battery module may undergo post-treatment breakdown. For example, each member of the battery module is removed.

In some embodiments, the battery module 302 undergoes further stimulation from a sonifier 313. For example, as the battery module 302 is treated (e.g., sprayed or submerged) with the dielectric mixture, the sonifier 313 may transmit ultrasound energy to agitate nanoparticles in the polymer matrix of the adhesives joints, thereby propagating a series of compression. In some embodiments, the treatment period may be decreased with the use of heat applied to the mixture. For example, as the battery module is treated with the dielectric mixture 312, heater 311 may heat the mixture and thereby heat the adhesive joints. Although FIG. 3 illustrates the sonifier 313 on the bottom left of the container system 309, it may be positioned in various places as well, such as on the side of the system 309 or the bottom center of the system 309.

Figure 4A:
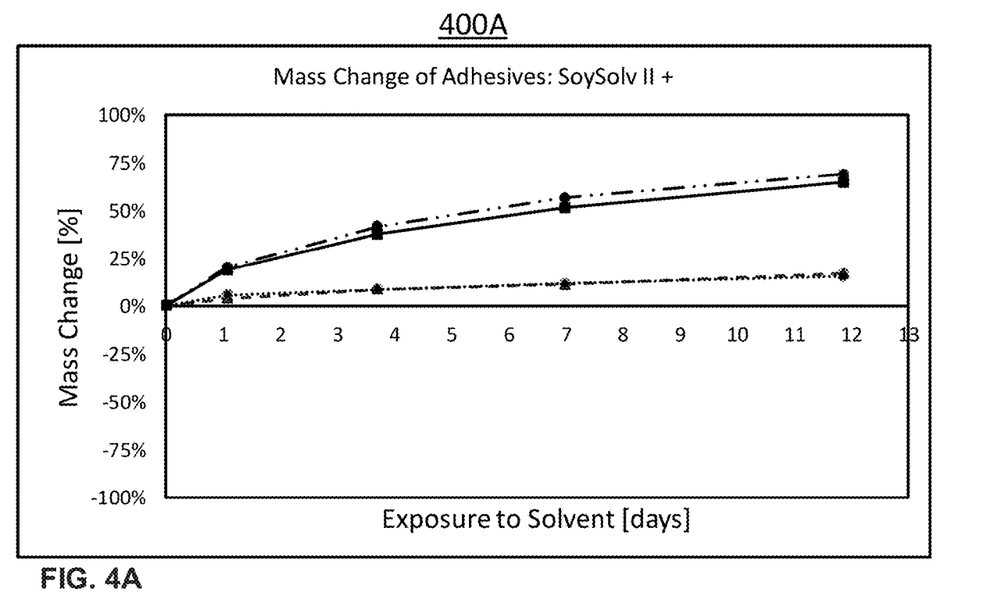
FIG. 4A shows a graph of change in mass of a sample of adhesive exposed to a dielectric mixture over time, in accordance with some embodiments of the present disclosure.

FIG. 4A shows a graph of change in mass of a sample of adhesive exposed to a dielectric mixture 312 over time, in accordance with some embodiments of the present disclosure. As the battery module is submerged in the dielectric mixture 312, the adhesives swell or enlarge in mass as the mixture is penetrating the adhesive. The data collected to generate FIG. 4A is based on the adhesives employed in a battery system with no agitation or heat applied. As can be seen, the samples increased in size of 10% to 50% over 12 days. This phenomenon of the mass increase in adhesive occurs even as some of the adhesives dissolve. As the dielectric mixture 312 penetrates the adhesive and the mass increases, the strength of the bond weakens, which allows for a simpler breakdown of the battery module.

Figure 4B:
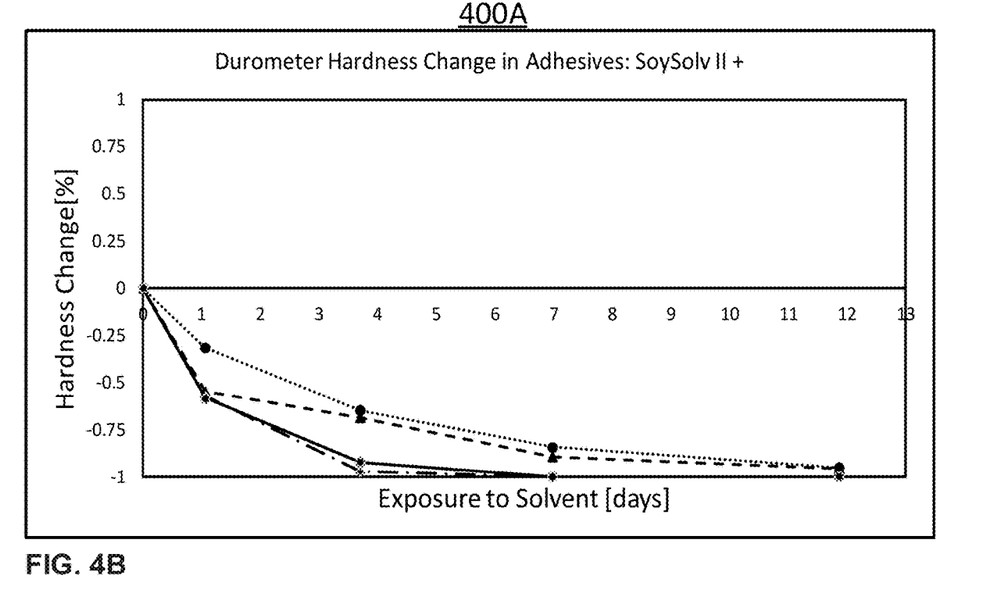
FIG. 4B shows a graph of change in hardness of a sample of adhesive exposed to the dielectric mixture over time, in accordance with some embodiments of the present disclosure.

FIG. 4B shows a graph of change in hardness of a sample of adhesive exposed to the dielectric mixture 312 over time, in accordance with some embodiments of the present disclosure. As the battery module is submerged in the dielectric mixture 312 and the dielectric mixture 312 penetrates the adhesive, the adhesives soften or the hardness decreases. The data collected to generate FIG. 4B is based on the adhesives employed in a battery system treated with the dielectric mixture 312 with no agitation or heat applied. As can be seen, the hardness in the adhesive decreases by close to 90% over 12 days. This phenomenon of the hardness decreasing in adhesive occurs even as some of the adhesives dissolve. As the dielectric mixture 312 penetrates the adhesive, the strength of the bond weakens, which allows for a simpler breakdown of the battery module.

Figure 5:
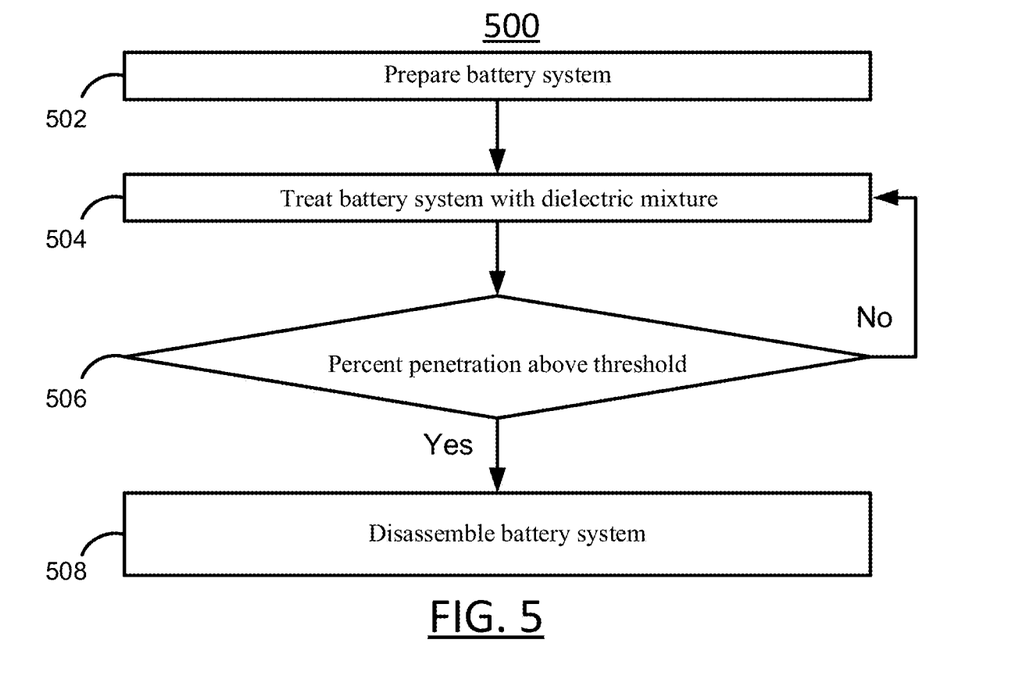
FIG. 5 shows an illustrative flow diagram of a process for disassembling a battery system, in accordance with some embodiments of the present disclosure.

FIG. 5 shows an illustrative flow diagram of a process 500 for disassembling a battery system, in accordance with some embodiments of the present disclosure. It should be noted that process 500 or any step thereof could be performed on, or provided by, the system of FIG. 7. In addition, one or more steps of process 600 may be incorporated into or combined with one or more other steps described herein. Step 502 includes preparing the battery system for the treatment. For example, removing the battery system from the vehicle and removing any components non-compatible with a dielectric mixture or components that are easily removed (e.g., a battery module cover or housing). In some embodiments, a specific part of the battery needs to be disassembled, and accordingly, the area around the specific area is prepared for treatment with the mixture. In some embodiments, where the entire battery is being disassembled, the battery system is positioned onto an attachment 306, which is connected to the conveyor 308 and which carries the battery system through the treatment step. Attachment 306 supports the battery from the bottom side 304 to allow the mixture, when applied, to freely traverse the battery system.

Step 504 includes treating the battery system with the dielectric mixture. The dielectric mixture employed to break the bonded joints between the plurality of members is selected from one of polyalphaolefins, fluorinated fluids and synthetic esters and natural esters. In some embodiments, the dielectric mixture is non-aqueous and includes esters for the breakdown of the adhesives. The esters may be a fatty acid ester solvent, preferably a fatty acid methyl ester mixture combined with an alkylamine compound that acts as an adjuvant. The treatment may be performed by spraying, submersion, or a combination of the two. In some embodiments, the battery system's adhesive bonds are sprayed with the dielectric mixture as part of the treatment to break the bonds or partially break the bonds.

Step 506 includes determining the penetration of the dielectric mixture into the adhesives. This may be determined as a function of the mass increase of the adhesive. In some embodiments, step 404 may be repeated for each type of the plurality of adhesive types. For example, some adhesives may have a very quick disassembly based on a quick penetration of the adhesive. On the other hand, some adhesives may require additions treatment (e.g., sonication, heat, etc.) of the bonds.

Step 508 includes disassembling the battery modules. In some embodiments, step 508 includes the disassembling of one or more of the adhesives of battery system. For example, disassembling may include applying force, applying heat, applying a chemical agent to cause weakening, applying sonication, allowing at least a predetermined period of time to pass until stress is applied to the adhered joint, applying any other suitable disassembling techniques, or any combination thereof. It will be understood that step 508 may be performed multiple times. For example, step 508 may be performed after steps 504 and 506. In some embodiments, step 508 may be automatic, in that as the adhesive bonds partially break, the members of the battery module begin to break away automatically. In some embodiments, an additional external force is necessary to complete the disassembly of the battery module.

Process 500 may include positioning and breaking bonds of any suitable components in a battery apparatus using a dielectric mixture. For example, in some embodiments, process 500 includes applying different adhesives to each of the other functions.

Figure 6:
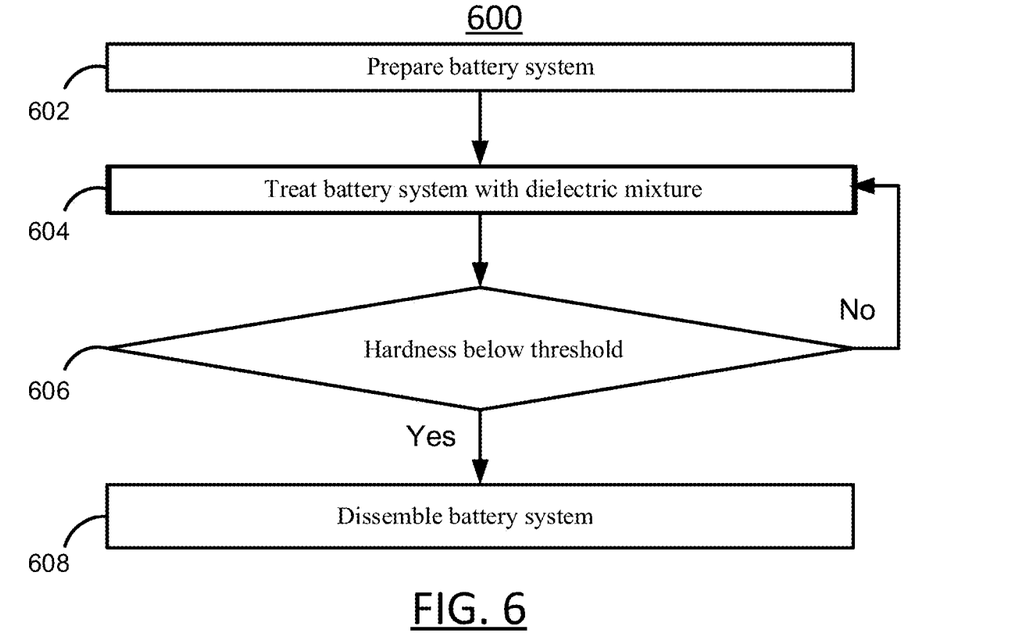
FIG. 6 shows another illustrative flow diagram of a process for disassembling a battery system, in accordance with some embodiments of the disclosure.

FIG. 6 shows another illustrative flow diagram of a process 600 for disassembling a battery system, in accordance with some embodiments of the disclosure. It should be noted that process 600 or any step thereof could be performed on, or provided by, the system of FIG. 7. In addition, one or more steps of process 500 may be incorporated into or combined with one or more other steps described herein. Step 602 includes preparing the battery system for the treatment. For example, removing the battery system from the vehicle and removing any components non-compatible with a dielectric mixture. In some embodiments, a specific part of the battery needs to be disassembled, and accordingly, the area around the specific area is prepared for treatment with the mixture. In some embodiments, where the entire battery is being disassembled, the battery system is positioned onto an attachment 306, which is connected to the conveyor 308 and which carries the battery system through the treatment step. Attachment 306 supports the battery from the bottom side 304 to allow the mixture, when applied, to freely traverse the battery system.

Step 604 includes treating the battery system with the dielectric mixture. The dielectric mixture employed to break the bonded joints between the plurality of members is selected from one of polyalphaolefins, fluorinated fluids and synthetic esters and natural esters. In some embodiments, the dielectric mixture is non-aqueous and includes esters for the breakdown of the adhesives. The esters may be a fatty acid ester solvent, preferably a fatty acid methyl ester mixture combined with an alkylamine compound that acts as an adjuvant. The treatment may be performed by spraying, submersion, or a combination of the two. In some embodiments, the battery system's adhesive bonds are sprayed with the dielectric mixture as part of the treatment to break the bonds or partially break the bonds.

Step 606 includes determining the hardness of the adhesives. The hardness may be determined by a durometer. Further, step 606 includes determining that the hardness of the adhesives is below a threshold. In some embodiments, steps 604 may be repeated for each type of the plurality of adhesive types. For example, some adhesives may have a very quick disassembly based on a quick softening. On the other hand, some adhesives may require additions treatment (e.g., sonication, heat, etc.) of the bonds.

Step 608 includes disassembling the battery modules. Step 608 includes the disassembling of one or more of the adhesives of battery system. For example, disassembling may include applying force, applying heat, applying a chemical agent to cause weakening, applying sonication, allowing at least a predetermined period of time to pass until stress is applied to the adhered joint, applying any other suitable disassembling techniques, or any combination thereof. It will be understood that step 608 may be performed multiple times. For example, step 608 may be performed after steps 604 and 606. In some embodiments, step 608 may be automatic, in that as the adhesive bonds partially break, the members of the battery module begin to break away automatically. In some embodiments, an additional external force is necessary to complete the disassembly of the battery module.

Process 600 may include positioning and breaking bonds of any suitable components in a battery apparatus using a dielectric mixture. For example, in some embodiments, process 600 includes applying different adhesives to each of the other functions.

Figure 7:
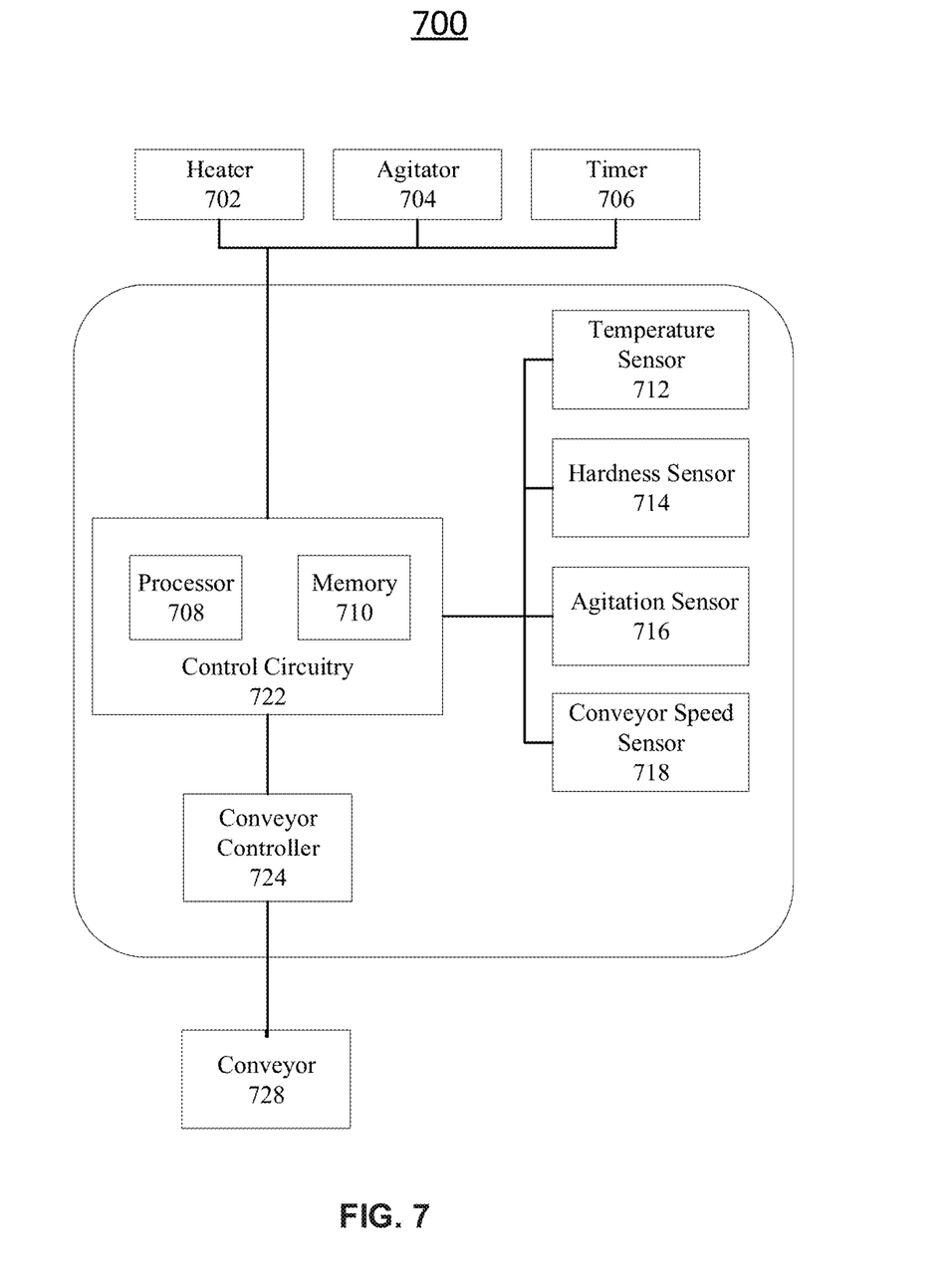
FIG. 7 depicts a system diagram of an illustrative system including processing circuitry, inputs variables, sensors and output variables, in accordance with some embodiments of the present disclosure.

FIG. 7 depicts a system diagram of an illustrative system 700 including control circuitry 722, heater 702, agitator 704, timer 706, sensors 712-718, conveyor controller 724 and conveyor 728, in accordance with several embodiments of the disclosure. In some embodiments, as the battery module is treated with the dielectric mixture, heater 702, controlled via the control circuitry 722, may heat the mixture and thereby heat the adhesive joints. As a result of the heat applied, the treatment period may decrease. In some embodiments, as the battery module is treated with the dielectric mixture, agitator 704, controlled via the control circuitry 722, may mix the mixture and thereby uniformly distributing the mixture within the battery module. As a result of the uniform mixture, the treatment period to break or partially break the adhesive joints may decrease. In some embodiments, as the battery module is treated with the dielectric mixture, timer 706 controls the length of the treatment period to break or partially break the adhesive joints. For example, if the battery module needs only one bond formed by the adhesive to break, the timer may set for a shorter treatment period.

Illustrative system 700 further includes control circuitry 722 including a processor 708, and memory 710. Control circuitry 722 may include hardware, software, or both, implemented on one or more modules configured to provide control of disassembly apparatus. In some embodiments, processor 708 includes one or more microprocessors, microcontrollers, digital signal processors, programmable logic devices, field-programmable gate arrays (FPGAs), application-specific integrated circuits (ASICs), or any suitable combination thereof. In some embodiments, processor 708 is distributed across more than one processor or processing units. In some embodiments, control circuitry 722 executes instructions stored in memory for managing conveyors, as shown in FIG. 3. In some embodiments, memory 710 is an electronic storage device that is part of control circuitry 722. For example, memory 710 may be configured to store electronic data, computer instructions, applications, firmware, or any other suitable information. In some embodiments, memory 710 includes random-access memory, read-only memory, hard drives, optical drives, solid-state devices, or any other suitable memory storage devices, or any combination thereof. For example, memory 710 may be used to launch a start-up routine.

In some embodiments, the system may include temperature sensor 712, hardness sensor 714, agitation sensor 716, conveyor speed sensor 718. In some embodiments, the control circuitry may be communicatively connected to one or more temperature sensors 712 to monitor for temperature around the battery system (e.g., the temperature of the dielectric mixture). In some embodiments, the control circuitry may be communicatively connected to one or more hardness sensors 714 that provide data indicative of the hardness of the adhesives within the battery system. In some embodiments, based on the data provided by the agitation sensor 716, the control circuitry may determine if agitation is being applied to the mixture and how much agitation is applied, adhesive breakdown may be increased. In some embodiments, the control circuitry may be communicatively connected to one or more conveyor speed sensors 718 that provide data indicative of the time of the battery system being treated with the dielectric mixture.

Illustrative system 700 of FIG. 7 may be used to perform any or all of the illustrative steps of processes 500 and 600 of FIGS. 5 and 6. Illustrative system 700 of FIG. 7, specifically, the control circuitry, controller, and sensors may be used to control the apparatus of FIG. 3, in accordance with the present disclosure. In some embodiments, not all components shown in FIG. 7 need be included in system 700.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses but is intended to include variations to and modifications thereof, which are within the spirit of the following claims.

What is claimed is:

1. A method for disassembling a battery system, the method comprising:
preparing the battery system for treatment, wherein the battery system comprises a first adhesive that bonds a first plurality of members, and a second adhesive that bonds a second plurality of members;
submerging the battery system in a bath of a dielectric mixture to at least partially break the first adhesive and the second adhesive;

allowing the dielectric mixture to penetrate the first adhesive and the second adhesive to reach a penetration threshold;
in response to the dielectric mixture penetration exceeding the penetration threshold, removing the battery system from the bath of the dielectric mixture; and
disassembling the first plurality of members and the second plurality of members.

2. The method of claim 1, wherein the battery system further comprises a third adhesive bonding a third plurality of members, wherein the method further comprises:
treating the battery system with the dielectric mixture to further break down the third adhesive, and
disassembling the third plurality of members.

3. The method of claim 2, wherein the first adhesive, the second adhesive, and the third adhesive comprise different adhesives.

4. The method of claim 3, wherein each of the first adhesive, the second adhesive, and the third adhesive comprises one or more of a thermal adhesive, a high strength adhesive, or a UV adhesive.

5. The method of claim 2, wherein each of the first adhesive, the second adhesive, and the third adhesive is a acrylic adhesive.

6. The method of claim 1, wherein the dielectric mixture comprises synthetic esters and/or natural esters.

7. The method of claim 1, wherein:
the first adhesive bonds the first plurality of members comprising a first side of a carrier to a plurality of battery cells; and
the second adhesive bonds the second plurality of members comprising a sidewall to the plurality of battery cells.

8. The method of claim 1, wherein the battery system maintains an electric charge while the battery system is being treated with the dielectric mixture.

9. The method of claim 1, wherein submerging the battery system in the bath of the dielectric mixture comprises:
submerging the battery system in the bath of the dielectric mixture for a predetermined period; and
removing the battery system from the bath.

10. The method of claim 9, further comprising:
agitating the dielectric mixture by sonication while the battery system is submerged in the bath of the dielectric mixture; and
heating the dielectric mixture to a predetermined temperature.

11. A method for disassembling a battery system, the method comprising:
preparing the battery system for treatment, wherein the battery system comprises a first adhesive that bonds a first plurality of members, and a second adhesive that bonds a second plurality of members;
submerging the battery system in a bath of a dielectric mixture to at least partially break the first adhesive and the second adhesive;
monitoring hardness of the first adhesive and the second adhesive; in response to the hardness of the first adhesive and the second adhesive falling below a hardness threshold, removing the battery system from the bath of the dielectric mixture; and
disassembling the first plurality of members and the second plurality of members.

12. The method of claim 11, wherein the battery system further comprises a third adhesive bonding a third plurality of members, wherein the method further comprises:
treating the battery system with the dielectric mixture to further break down the third adhesive, and
disassembling the third plurality of members.

13. The method of claim 12, wherein the first adhesive, the second adhesive, and the third adhesive comprise different adhesives.

14. The method of claim 13, wherein each of the first adhesive, the second adhesive, and the third adhesive comprises one or more of a thermal adhesive, a high strength adhesive, or a UV adhesive.

15. The method of claim 12, wherein each of the first adhesive, the second adhesive, and the third adhesive is a acrylic adhesive.

16. The method of claim 11, wherein the dielectric mixture comprises synthetic esters and/or natural esters.

17. The method of claim 11, wherein:
the first adhesive bonds the first plurality of members comprising a first side of a carrier to a plurality of battery cells; and
the second adhesive bonds the second plurality of members comprising a sidewall to the plurality of battery cells.

18. The method of claim 11, wherein the battery system maintains an electric charge while the battery system is being treated with the dielectric mixture.

19. The method of claim 11, further comprising:
agitating the dielectric mixture by sonication while the battery system is submerged in the bath of the dielectric mixture; and
heating the dielectric mixture to a predetermined temperature.

20. An apparatus for disassembling a battery module, comprising:
a conveyor configured to transport the battery module, wherein the battery module comprises a first adhesive that bonds a first plurality of members and a second different adhesive that bonds a second plurality of members;
a container system containing a dielectric mixture to break the first adhesive and the second adhesive, wherein the container system comprises:
a container for holding the dielectric mixture;
a sonifier configured to agitate by sonication the dielectric mixture in the container while the battery module is submerged in a bath of the dielectric mixture; and
a heater configured to heat the dielectric mixture to a predetermined temperature; control circuitry configured to cause the conveyor to:
submerge the battery module in the dielectric mixture to at least partially break the first adhesive and the second adhesive;
allow the dielectric mixture to penetrate the first adhesive and the second adhesive to reach a penetration threshold; and
in response to the dielectric mixture penetration exceeding the penetration threshold, remove the battery module from the bath of the dielectric mixture; and
a disassembly conveyor configured to receive the battery module for disassembling of the battery module after the battery module is removed from the bath.

* * * * *